United States Patent
Fischer

(10) Patent No.: US 10,149,556 B2
(45) Date of Patent: Dec. 11, 2018

(54) PENDANT STAND

(71) Applicant: John G. Fischer, Irving, TX (US)

(72) Inventor: John G. Fischer, Irving, TX (US)

(73) Assignee: Tooth Fairy Designs, Inc., Irving, TX (US)

( * ) Notice: Subject to any disclaimer, the term of this patent is extended or adjusted under 35 U.S.C. 154(b) by 0 days.

(21) Appl. No.: 15/293,120

(22) Filed: Oct. 13, 2016

(65) Prior Publication Data

US 2018/0035826 A1    Feb. 8, 2018

Related U.S. Application Data

(63) Continuation-in-part of application No. 29/573,624, filed on Aug. 8, 2016.

(51) Int. Cl.
| | | |
|---|---|---|
| *A47F 7/02* | (2006.01) | |
| *F16M 11/04* | (2006.01) | |
| *A47F 5/00* | (2006.01) | |
| *F16M 11/16* | (2006.01) | |
| *F16M 11/22* | (2006.01) | |
| *F16B 1/00* | (2006.01) | |

(52) U.S. Cl.
CPC .................. *A47F 7/02* (2013.01); *A47F 5/00* (2013.01); *F16M 11/041* (2013.01); *F16M 11/16* (2013.01); *F16M 11/22* (2013.01); *F16B 2001/0035* (2013.01); *F16M 2200/068* (2013.01)

(58) Field of Classification Search
CPC ...... A47F 7/02; A47F 5/00; F16B 1/00; F16B 2001/0035; F16M 11/041; F16M 11/22; F16M 11/16; F16M 2200/068

USPC .......... 248/121, 127, 146, 519, 117.2, 309.1, 248/309.4, 310, 346.01, 357, 910, 683, 248/537, 206.5; 24/303; 292/251.51; 206/6.1

See application file for complete search history.

(56) References Cited

U.S. PATENT DOCUMENTS

| | | | | |
|---|---|---|---|---|
| 1,505,539 | A | * | 8/1924 | Burke .................... A47F 7/0071 248/127 |
| 3,086,268 | A | * | 4/1963 | Chaffin, Jr. .............. A41F 1/002 119/863 |
| 3,378,136 | A | * | 4/1968 | Lubin ...................... A47G 1/12 206/6.1 |
| 3,552,705 | A | * | 1/1971 | Caster ...................... A47K 5/05 248/309.4 |
| D242,413 | S | * | 11/1976 | Olson ........................... D6/672 |
| 4,936,466 | A | * | 6/1990 | Nava ......................... A47F 7/02 206/566 |
| D385,751 | S | * | 11/1997 | Hollinger ...................... D7/601 |

(Continued)

*Primary Examiner* — Muhammad Ijaz

(57) ABSTRACT

A desktop pendant stand is provided, having a base with a center and an outer perimeter edge. One or more arms are attached to the base. The arm has a lower portion extending upwards from the base, and an upper portion extending above the lower portion. A cylindrical orifice is located on an inside of the upper portion of the arm. A stand magnet is located in the orifice. A clasp assembly is provided, having a mechanical clasp for connection to a bail of a pendant. A clasp magnet is pivotally connected to a distal end of the clasp by a connector. The clasp magnet is magnetically connectable to the stand magnet to suspend the mechanical clasp downward from the upper portion of the arm.

13 Claims, 9 Drawing Sheets

(56) References Cited

U.S. PATENT DOCUMENTS

| | | | |
|---|---|---|---|
| 6,352,229 B1 * | 3/2002 | Adams | A47G 1/17 24/67 R |
| D479,099 S * | 9/2003 | Ancona | D7/601 |
| D481,265 S * | 10/2003 | Ancona | D7/601 |
| 6,857,616 B1 * | 2/2005 | Gasperi | A47K 5/05 248/309.4 |
| D524,111 S * | 7/2006 | Goodman | D7/601 |
| D634,980 S * | 3/2011 | Goodman | D7/601 |
| D651,675 S * | 1/2012 | Norton | D21/787 |
| 8,381,413 B2 * | 2/2013 | Smith | F26B 25/18 211/116 |
| 2010/0024175 A1 * | 2/2010 | Cserpes | A45F 5/04 24/303 |

* cited by examiner

PENDANT STAND

CROSS-REFERENCE TO RELATED APPLICATION

This application is a continuation-in-part of, and claims the benefit of, related U.S. application Ser. No. 29/573,624 filed Aug. 8, 2016, entitled PENDANT STAND, by John G. Fischer, the disclosure of which is incorporated by reference herein in its entirety.

TECHNICAL FIELD

The disclosed embodiments relate to jewelry, and more particularly to a mechanism for the storage and display of pendants. One embodiment discloses a pendant stand capable of detachably displaying pendants in a vertical orientation as removed from their necklaces. The bail of the pendant is connected to a clasp. The clasp is connected to a magnet. The magnet is engageable with another magnet permanently adhered to the underside of the arm of the pendant stand.

More particularly, the embodiments disclosed relate to a method of displaying pendants in a manner that permits pendants to be converted from wearable items into displayed desktop keepsakes. The novelty of this product is that it contradicts the universal practice of millenniums by pendant owners and by jewelry retailers to provide a converted functionality to the pendant.

BACKGROUND

Pendant owners normally keep their pendants secured on an appropriate necklace that has been selected for material, color, style and size compatibility with each pendant. When not wearing their pendants, they are normally secured on their necklaces in a jewelry box, or safe, or other safe storage container by the owner, along with the appropriate necklace. Personally owned pendants are not publically displayed, as such display might be deemed socially ostentatious, as well as an invitation to thieves.

Jewelry retailers normally display their pendants for sale beneath glass cabinetry for security purposes. In this position, customers are viewing the pendants from directly above. The pendants are displayed in a box or on a miniature bust at an angle that permits the viewer, who is looking down on the pendants, to better see the front of the pendants. Pendants are most frequently displayed on a necklace to permit the potential buyer to see the relationship between the necklace and the pendant, including the bail, if a bail is used to connect the pendant to the necklace.

A special need for the mechanism illustrated in the disclosed embodiments arises from observations related to the recent invention of certain baby teeth jewelry (see U.S. Pat. Nos. 8,226,877; 8,661,849; 9,364,993; D718,655), in which pendants are made from one or more processed baby teeth of a child or other relative of the jewelry owner. A primary value of these pendants is as attractive family heirlooms. Family heirloom pendants are not common. These pendants are distinguishable from rare gem stone pendants in that, although valuable heirlooms to family members, they offer little or no value to others, including thieves.

Heritage, or "heirloom", pendants are also unique in that they represent an expression of devotion to a family member, rather than a fashion statement or a symbol of status. Some potential buyers of an heirloom may prefer wearing fashion jewelry, and therefore may be reluctant to purchase an heirloom pendant. Other owners of heirloom pendants value them highly and are not inclined to wear them regularly for fear of loss or damage. Other owners, particularly men, who highly value the heirloom quality of the heirloom pendant, may not be inclined to regularly wear necklaces or pendants. Thus, the unique qualities of heirloom pendants present new challenges to their marketing.

Thus there is a need for a device that overcomes the challenges to marketing and owning heirloom pendants. The disclosed embodiments provide an apparatus and method for displaying pendants, including, but not limited to, devotional and heirloom pendants, in a non-retail environment that is uncommon to traditional jewelry displays.

The disclosed embodiments provide a method that overcomes the challenges to marketing and owning heirloom quality pendants, and provides the owners of other types of pendants an ability to display the pendants at home or work. First, despite centuries of owning pendants, it offers a device and method for storing and displaying pendants that is entirely new, and never before offered for this purpose, thus generating interest associated with its novelty. Second, it provides persons who are not inclined to wear heirloom pendants, and persons who are not inclined to wear jewelry, with an opportunity to own and display their devotional heirloom or other favorite pendants.

Third, it provides a device and method for enabling an entire line of pendants to be used as both pendants and as keepsake items. Fourth, it provides a vertically oriented pendant stand that is adapted for dresser or desktop display of a single heirloom pendant without the necklace. Fifth, one embodiment provides a device and method for freely rotating the pendant to any desired angle relative to the pendant stand. Sixth, it provides a means of easy detachment and reconnection for close inspection and sharing of the displayed pendant.

Other advantages of the disclosed embodiments will become apparent from the following descriptions, taken in connection with the accompanying drawings, wherein, by way of illustration and example, the embodiments are disclosed.

SUMMARY

As used herein, and in the parent patent to which this specification is related, the terms "substantial" and "substantially" mean mostly.

An advantage of the disclosed embodiments and method is that they provide a device and method for a pendant owner to display their pendant at home, such as on a counter, bookshelf, or desktop height surfaces. Another advantage of the disclosed embodiments is that they provide a force removable attachment for closer inspection and sharing of the pendant. Another advantage of the disclosed embodiments is that they provide a rotatable position of the pendant with regards to the pendant stand, permitting different display effects and compensating for different bail orientations to the pendant. Another advantage of the disclosed embodiments is that they provide a stand from which the pendant is readily disengaged for wearing on a necklace.

Other advantages will become apparent from the following descriptions, taken in connection with the accompanying drawings, wherein, by way of illustration and example, the various embodiments are disclosed.

In one embodiment a base is provided, having a center and an outer perimeter edge. An arm is attached to the base. The arm has a lower portion extending upwards away from the base, and an upper portion extending above the lower portion. A cylindrical orifice is located on an inside of the upper portion of the arm. A stand magnet is located in the orifice. A clasp assembly is provided, having a mechanical clasp for connection to a bail of a pendant. A clasp magnet is pivotally connected to a distal end of the clasp by a connector. The clasp magnet is magnetically connectable to the stand magnet to suspend the mechanical clasp downward from the upper portion of the arm.

BRIEF DESCRIPTION OF THE DRAWINGS

The drawings constitute a part of this specification and include exemplary embodiments, which may be embodied in various forms. It is to be understood that, in some instances, various aspects of the various embodiments may be shown exaggerated, enlarged or otherwise spatially modified to facilitate an understanding of the embodiment.

DETAILED DESCRIPTION

The following description is presented to enable any person skilled in the art to make and use the device of the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not intended to be limited to those shown, but is to be accorded the widest scope consistent with the principles and features disclosed herein.

Figure 1:
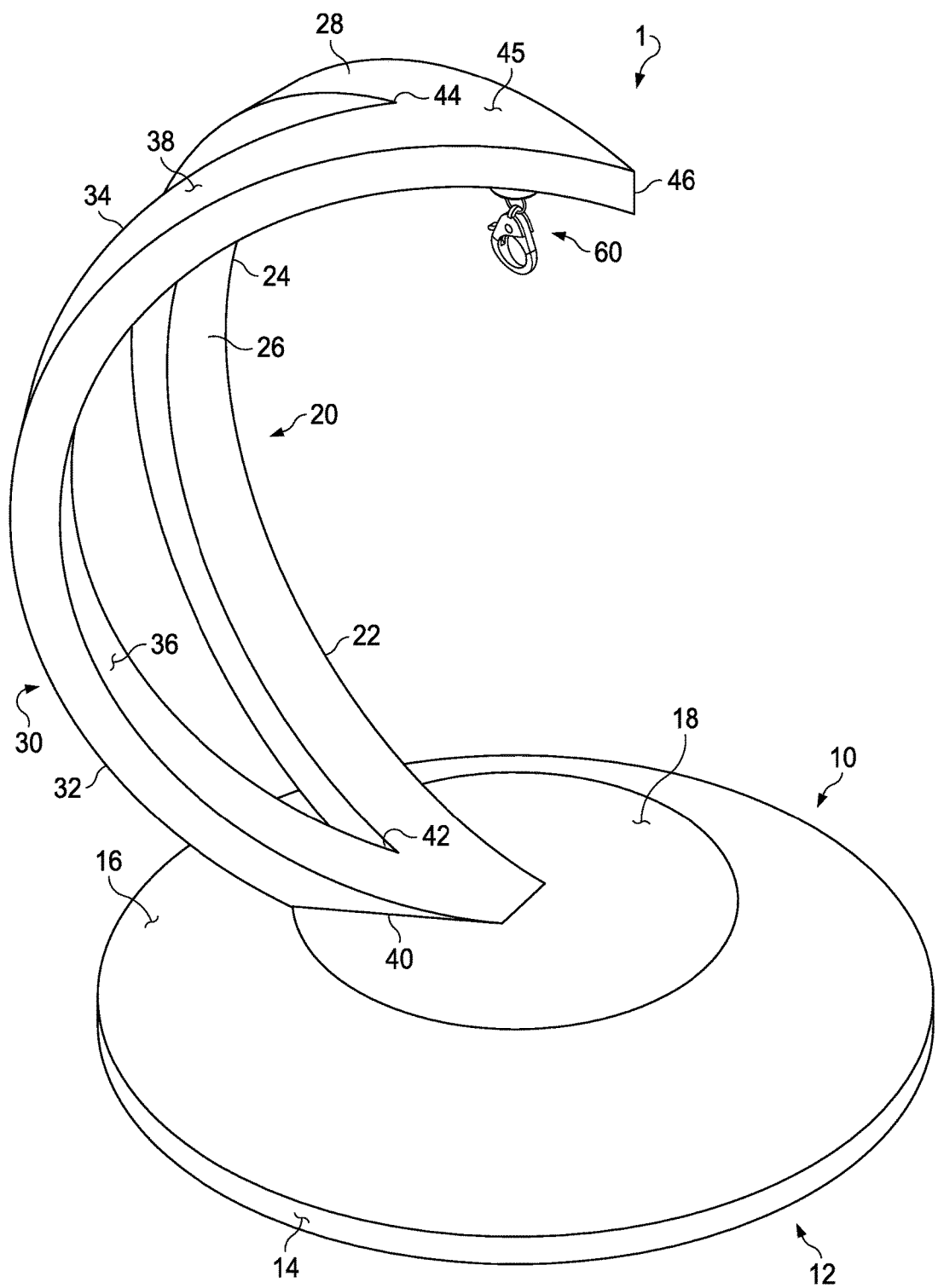
FIG. 1 is a perspective view of an embodiment of the new design for a pendant stand having a magnetic clasp support.

FIG. 1 is a perspective view of an embodiment of the new design for a pendant stand 1. A base 10 is provided. Base 10 has a bottom 12 (see FIG. 5) and a top 18. In one embodiment, a bevel 16 extends angularly downward and outward from top 18 toward the outer perimeter of bottom 12. An edge 14 extends between bevel 16 and bottom 12 to define an outer perimeter of base 10. Pendant stand 1 has a vertical centerline 100 (see FIG. 2).

In the embodiment illustrated, a pair of arms 20 and 30 are connected to base 10 and extend upwards and outwards therefrom. In this embodiment, arm 20 has a lower portion 22 and an upper portion 24. Arm 20 has an interior side 26 and an exterior side 28. Arm 30 has a lower portion 32 and an upper portion 34. Arm 30 has an interior side 36 and an exterior side 38.

Lower portions 22 and 32 intersect at lower intersection 42 above top 18 of base 10. Lower portions 22 and 32 of arms 20 and 30 intersect base 10 at base intersection 40. In the embodiment illustrated, base intersection 40 is an intersection of the geometry of lower portions 22 and 32 of arms 20 and 30 with the geometry of base 10, as opposed to a mere connection. As illustrated, lower intersection 42 and base intersection 40 provide a naturally flowing and aesthetically pleasing appearance.

Lower portions 22 and 32 of arms 20 and 30 extend outward towards edge 14 of base 10 and extend upwards away from base 10. Upper portions 24 and 34 extend upwards from lower portions 22 and 32, respectively, away from base 10 and inward towards centerline 100.

Upper portions 24 and 34 intersect at an upper intersection 44 and terminate at a terminus 46. A merged portion 45 exists between upper intersection 44 and terminus 46. In the embodiment illustrated, upper intersection 44 is an intersection of the geometry of upper portions 24 and 34 of arms 20 and 30, as opposed to a mere connection. As illustrated, upper intersection 44 provides a naturally flowing and aesthetically pleasing appearance.

Upper intersection 44 is located on one side of centerline 100. Terminus 46 is located on the other side of centerline 100. Centerline 100 is located on merged portion 45 between upper intersection 44 and terminus 46.

A clasp assembly 60 is shown suspended from merged portion 45. If pendant stand 1 is made from a magnetic material, clasp assembly 60 can be magnetically attached to merged portion 45 of pendant stand 1.

Figure 2:
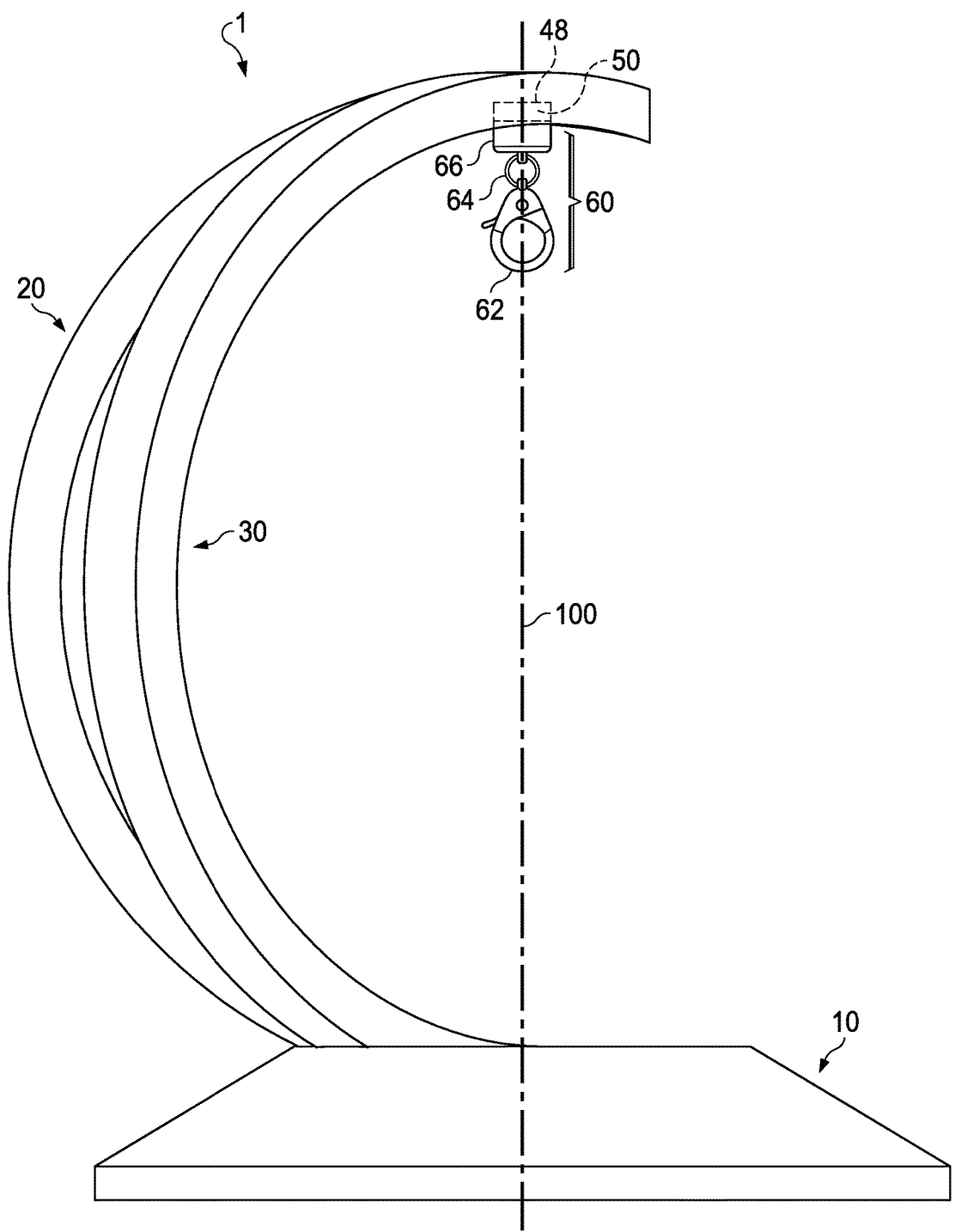
FIG. 2 is a front view of the embodiment of the pendant stand of FIG. 1.

FIG. 2 is a front view of the embodiment of pendant stand 1 of FIG. 1. In this embodiment, a cylindrical pocket 48 is formed on interior sides 26 and 36 of upper arm portions 24 and 34 at merged portion 45. A stand magnet 50, such as a rare earth magnet, is located in pocket 48. Stand magnet 50 may be adhered into pocket 48 by epoxy, by interference fit, or other method.

Clasp assembly 60 may comprise a clasp 62 for mechanical connection to a bail of a pendant (not shown). A connector 64 pivotally connects clasp 62 to a clasp magnet 66. Clasp magnet 66 has a polarity that is oriented to permit magnetic connection to clasp magnet 66. In the embodiment illustrated, pocket 48, stand magnet 50 and clasp magnet 66 are centered, or nearly centered, on centerline 100. In this context, "nearly centered" or "approximately centered" is intended to mean as within 10% of the radius of top 18.

In this embodiment, the pendant displayed may be removed from pendant stand 1 for closer inspection by simply pulling downward with a force that exceeds the magnetic force between stand magnet 50 and clasp magnet 66. If pendant stand 1 is made of a magnetic material, the force need only exceed the magnetic force of clasp magnet 66 to pendant stand 1.

Additionally, clasp 62 may be readily disengaged from a bail on the displayed pendant to allow the pendant to be placed on a necklace and worn. The empty clasp assembly 60 is reattached to pendant stand 1 to prevent loss.

Figure 3:
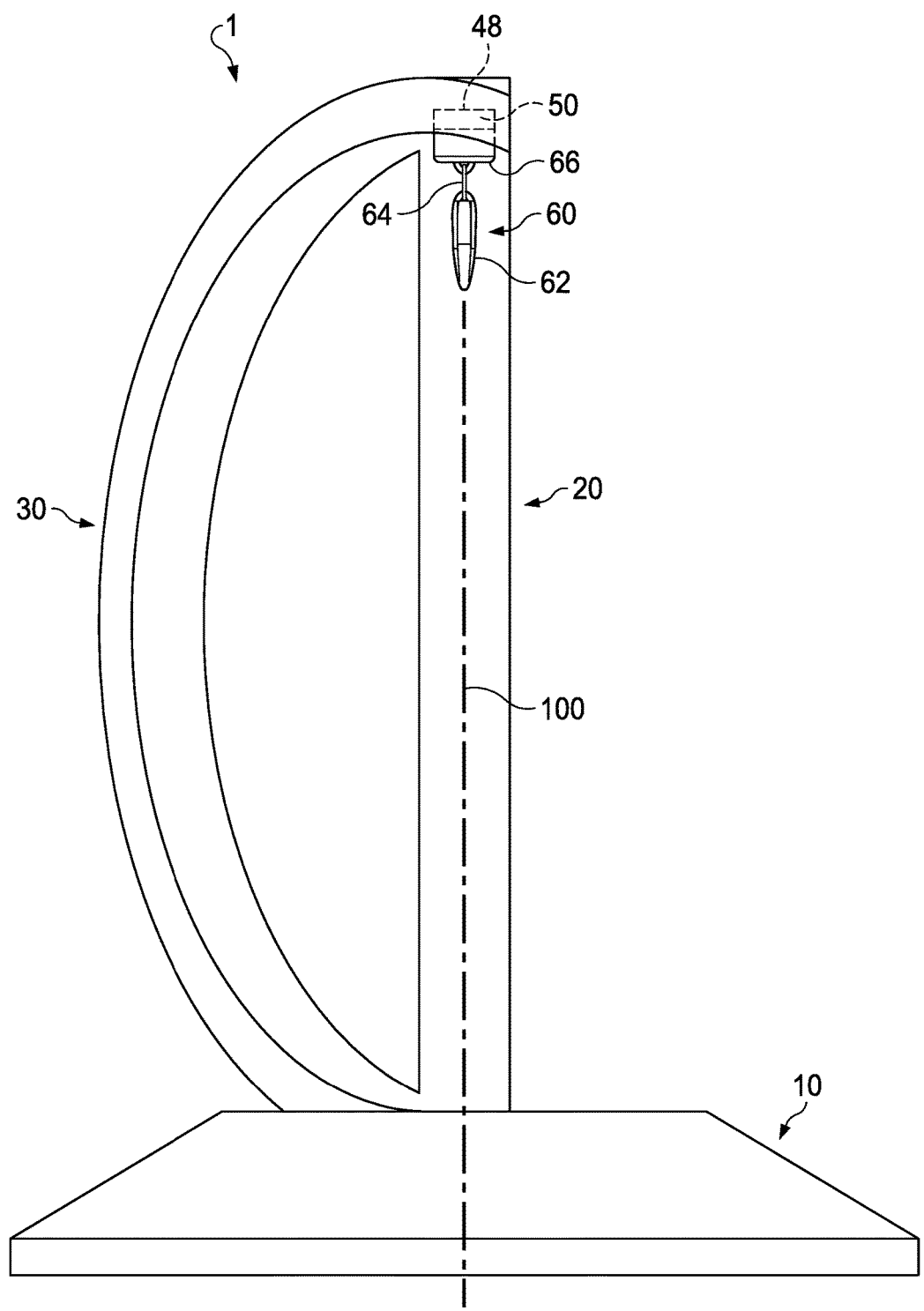
FIG. 3 is a right side view of the embodiment of the pendant stand of FIG. 1.

FIG. 3 is a right side view of the embodiment of pendant stand 1 of FIGS. 1 and 2. As seen in FIG. 3, in this view of the embodiment, illustrated arm 20 appears in alignment with centerline 100 from which a pendant will hang, providing a pleasing visual effect. Clasp assembly 60 may be rotated in relation to stand magnet 50 to provide the visual effect most desired in relation to the pendant.

Figure 4:
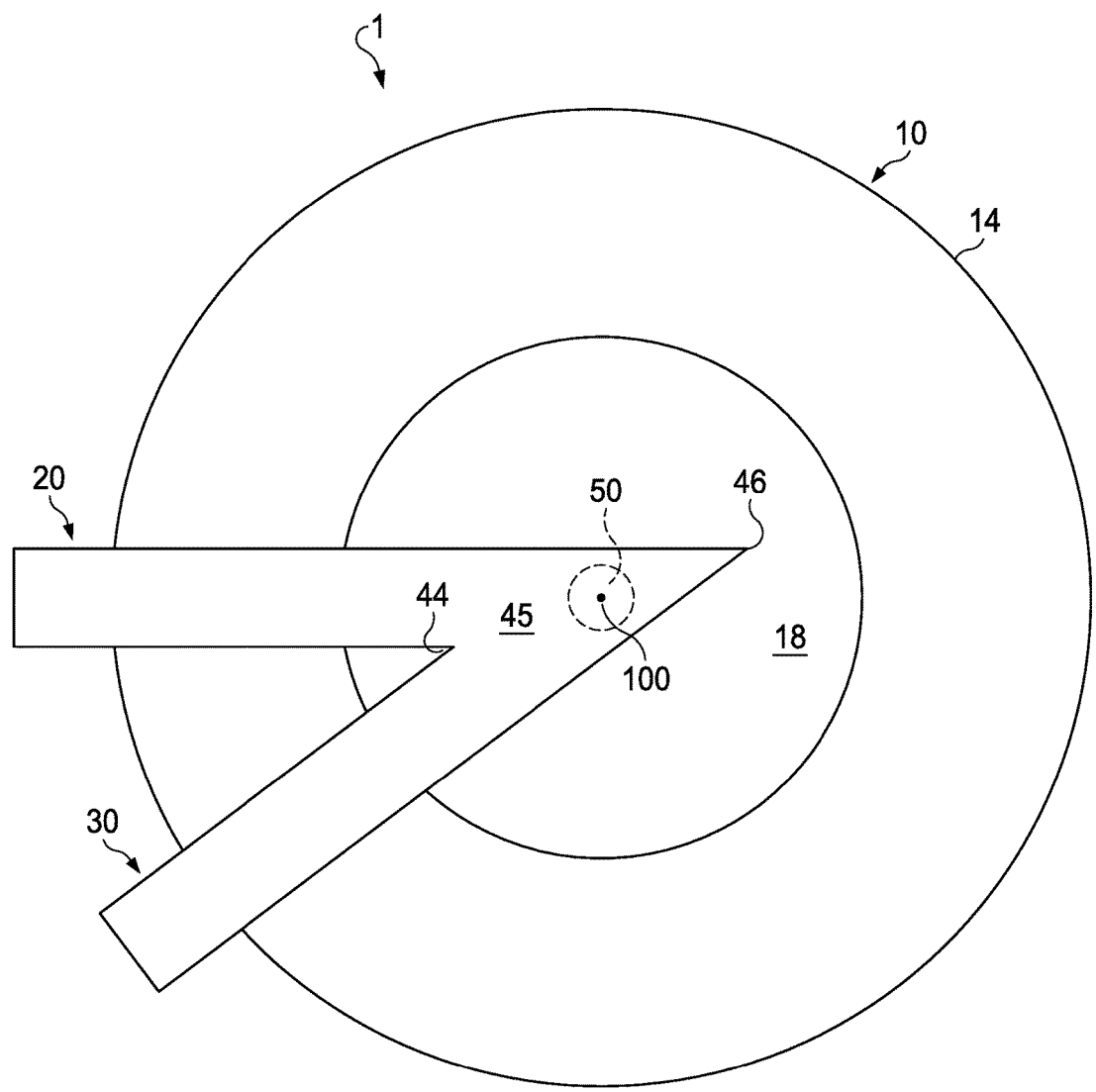
FIG. 4 is a top view of the embodiment of the pendant stand of FIG. 1.

FIG. 4 is a top view of the embodiment of pendant stand 1 of FIGS. 1-3. In this view, it is seen that terminus 46 extends beyond centerline 100, and that stand magnet 50 is located proximate to centerline 100.

Figure 5:
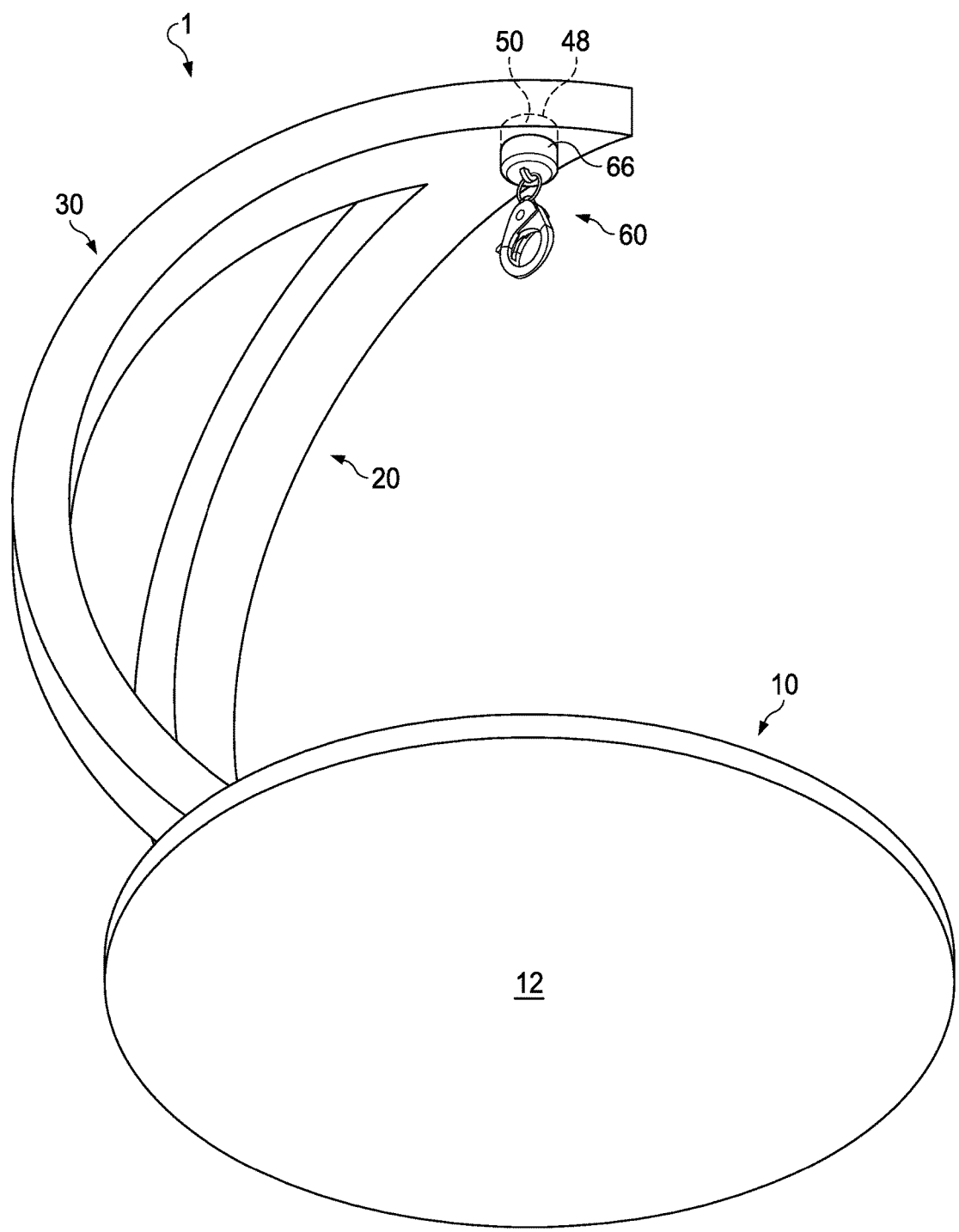
FIG. 5 is a bottom perspective view of the embodiment of the pendant stand of FIG. 1.

FIG. 5 is a bottom perspective view of the embodiment of pendant stand 1 of FIGS. 1-4.

Figure 6:
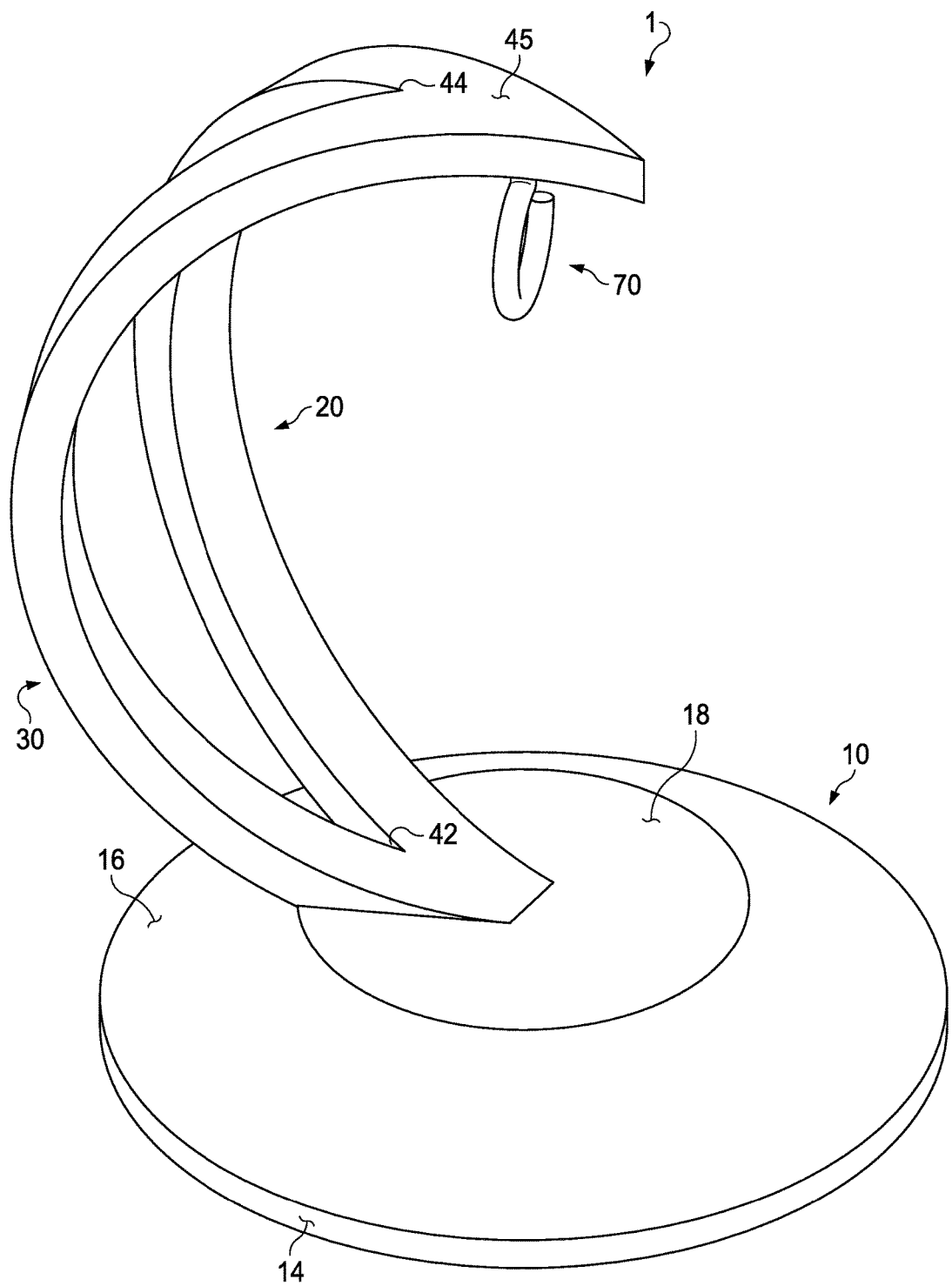
FIG. 6 is a perspective view of an embodiment of the new design for a pendant stand having a hook support.

FIG. 6 is a perspective view of an embodiment of the new design for pendant stand 1 having a hook support 70. In this embodiment, clasp assembly 60 is replaced with hook 70. Hook 70 may be attached to interior sides 26 and 36 of upper arm portions 24 and 34 at merged portion 45 by a number of methods such as cast in place, threaded connection, adhesive, solder, braze, or other appropriate method.

Figure 7:
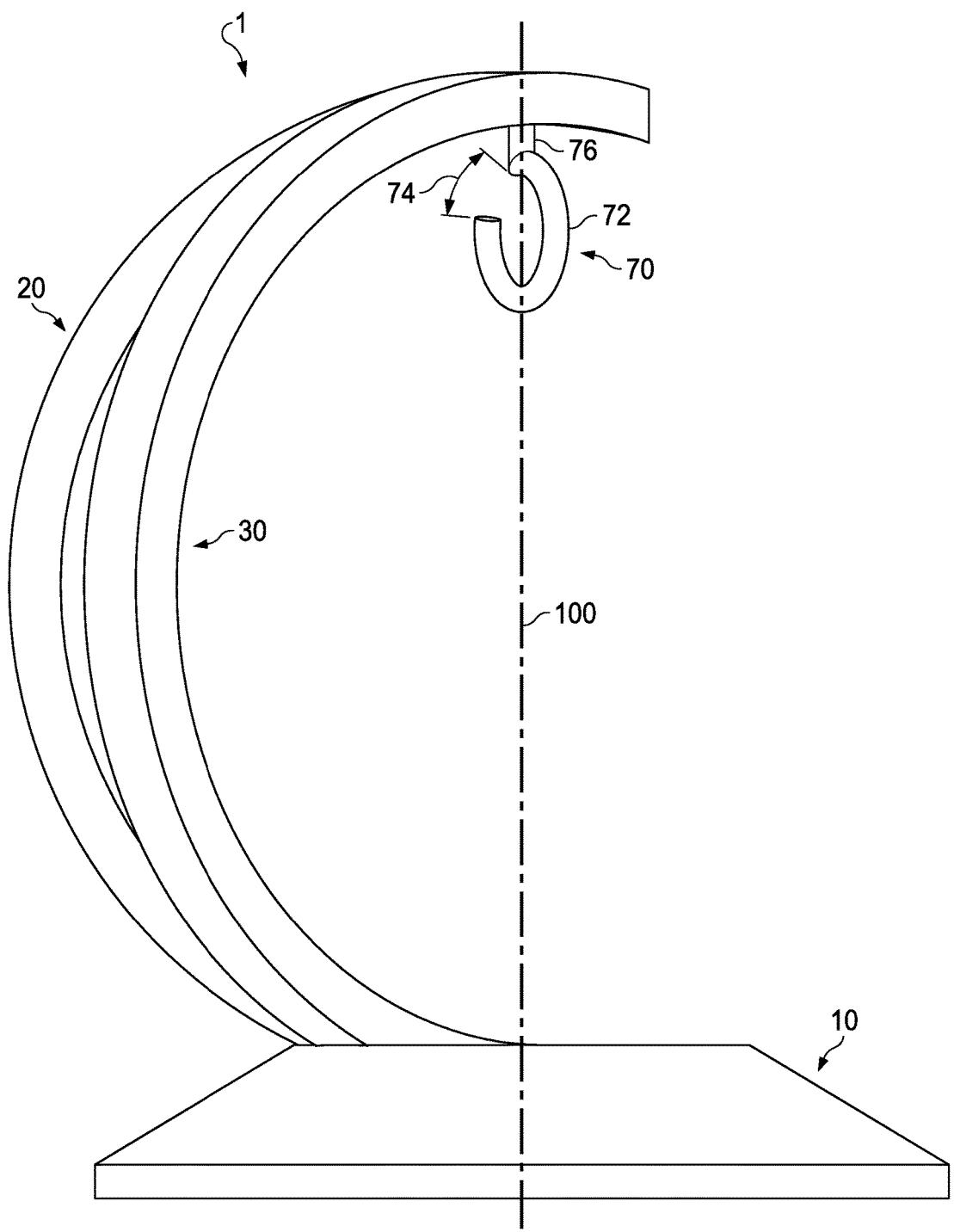
FIG. 7 is a front view of the embodiment of the pendant stand of FIG. 6.

FIG. 7 is a front view of the embodiment of pendant stand 1 of FIG. 6. As seen in this view, hook 70 has a radial portion 72 with an opening 74. A stem 76 extends to radial portion 72. Stem 76 is attached to interior sides 26 and 36 of upper arm portions 24 and 34 at merged portion 45. The bail of a pendant can be positioned on hook 70 through opening 74.

Figure 8:
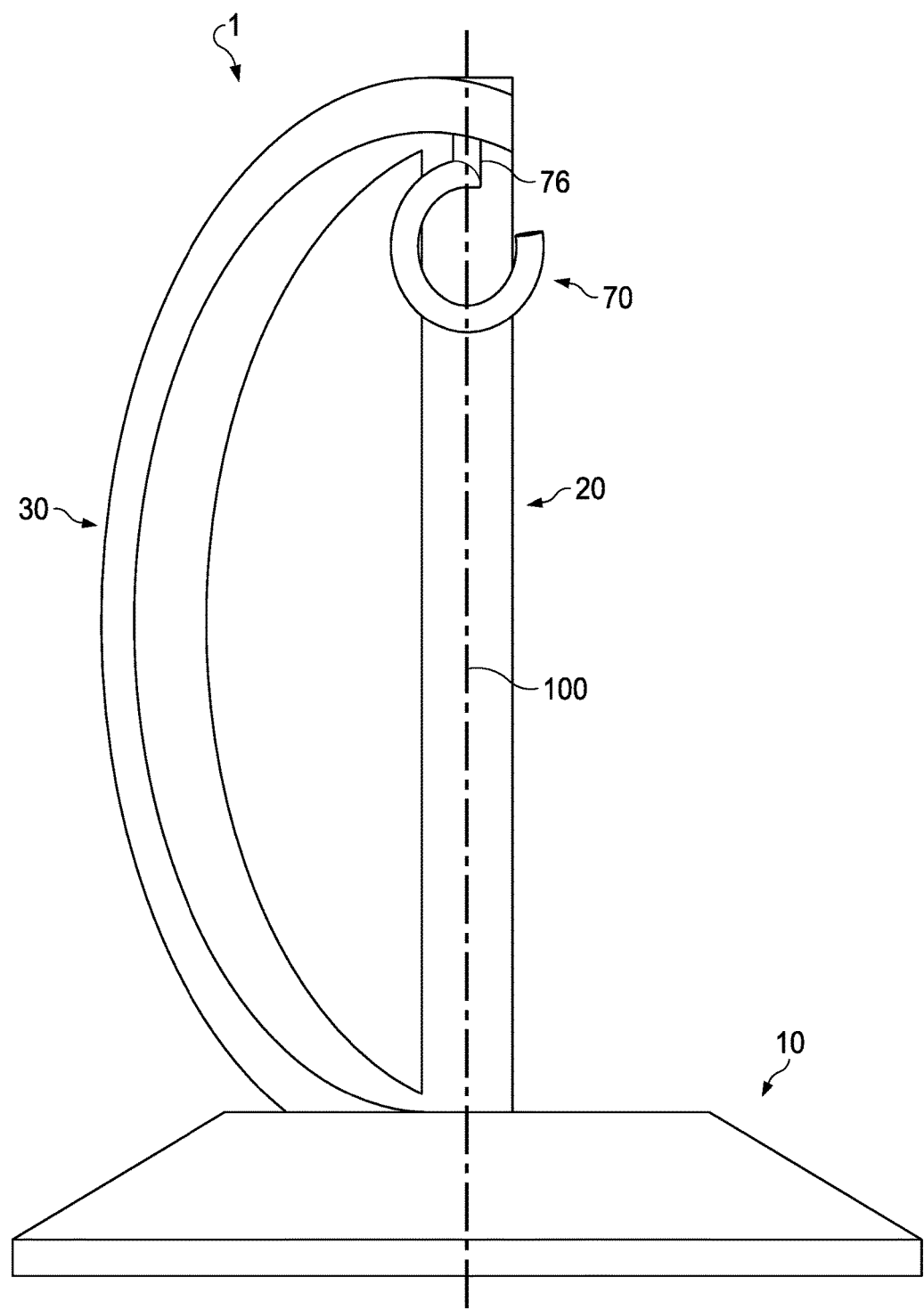
FIG. 8 is a right side view of the embodiment of the pendant stand of FIG. 6.

FIG. 8 is a right side view of the embodiment of pendant stand 1 of FIGS. 6 and 7.

Figure 9:
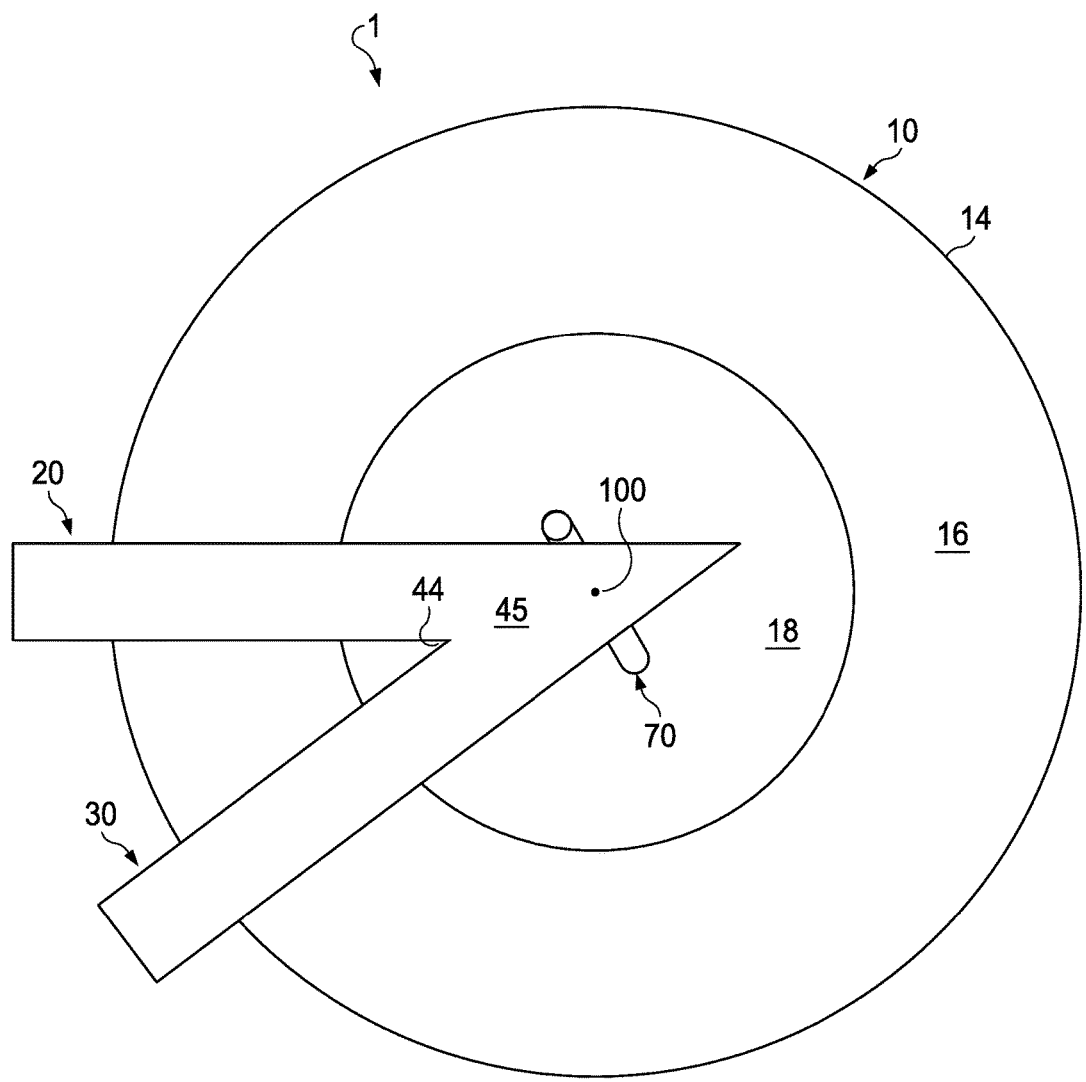
FIG. 9 is a top view of the embodiment of the pendant stand of FIG. 6.

FIG. 9 is a top view of the embodiment of the pendant stand 1 of FIGS. 6-8.

It will be appreciated that pendant stand 1 could be configured with one, two, or more arms to provide a different visual effect. In another embodiment of pendant stand 1 (not shown), two arms 20 and 30 are provided. Lower portions 22 and 32 are straightened to resemble the lower portion of the profile of a heart. Upper portions 24 and 34 are curved to resemble the upper portion of the profile of a heart. In this embodiment, pendant stand 1 appears to be in the shape of a heart.

The embodiments described above are not intended to be limited in scope to the particular form set forth, but, on the contrary, is intended to cover such alternatives, modifications and equivalents as may be included within the spirit and scope of the described embodiments and as defined by the appended claims.

I claim:

1. A pendant display stand, comprising:
   a base having a top, an outer perimeter, and a centerline extending vertically above a center of the top;
   a pair of arms, each of the arms having a lower portion extending from the base;
   each of the arms having an upper portion extending above the lower portion and inward towards the centerline of the base;
   an upper intersection formed where the upper portions of the arms intersect;
   a merged portion beyond the upper intersection;
   a terminus at an end of the merged portion;
   a cylindrical orifice located on a base side of the merged portion;
   a stand magnet located in the orifice; and,
   a clasp assembly comprising:
      a clasp for mechanical connection to a bail of a pendant; and,
      a clasp magnet pivotally connected to a distal end of the clasp; and,
      the clasp magnet being magnetically connectable to the stand magnet.

2. The pendant display stand of claim 1, further comprising:
   the upper portion of the arms extending downwards towards the base.

3. The pendant display stand of claim 1, further comprising:
   the stand magnet located approximately over the center of the base.

4. The pendant display stand of claim 1, further comprising:
   the stand and the clasp magnet being rare earth magnets.

5. The pendant display stand of claim 1, further comprising:
   the base comprising a bottom, a top, and a bevel connecting the bottom and the top.

6. The pendant display stand of claim 1, further comprising:
   the stand magnet located near the centerline of the base.

7. The pendant display stand of claim 1, further comprising:
   the pendant display stand configured to display a single pendant attached to the clasp without a necklace.

8. The pendant display stand of claim 1, further comprising:
   the distance between the clasp and the base being long enough to permit free rotation of the attached pendant without interference with the base.

9. The pendant display stand of claim 1, further comprising:
   a lower intersection formed at an intersection of the lower portion of each arm; and,
   the lower intersection located above the base.

10. The pendant display stand of claim 1, further comprising:
    a base intersection formed at an intersection of the lower portion of each arm with the base.

11. The pendant display stand of claim 1, further comprising:
    the arms having a rectilinear cross-section.

12. The pendant display stand of claim 1, the base further comprising:
    a bottom;
    an edge extending vertically upwards from the bottom to form a perimeter of the base; and,
    a bevel extending between the top and the edge.

13. The pendant display stand of claim 12, further comprising:
    a base intersection formed at an intersection of the lower portion of each arm with the base; and,
    the base intersection located on the top of the base, and not extending to the bevel of the base.

* * * * *